Patented June 16, 1942

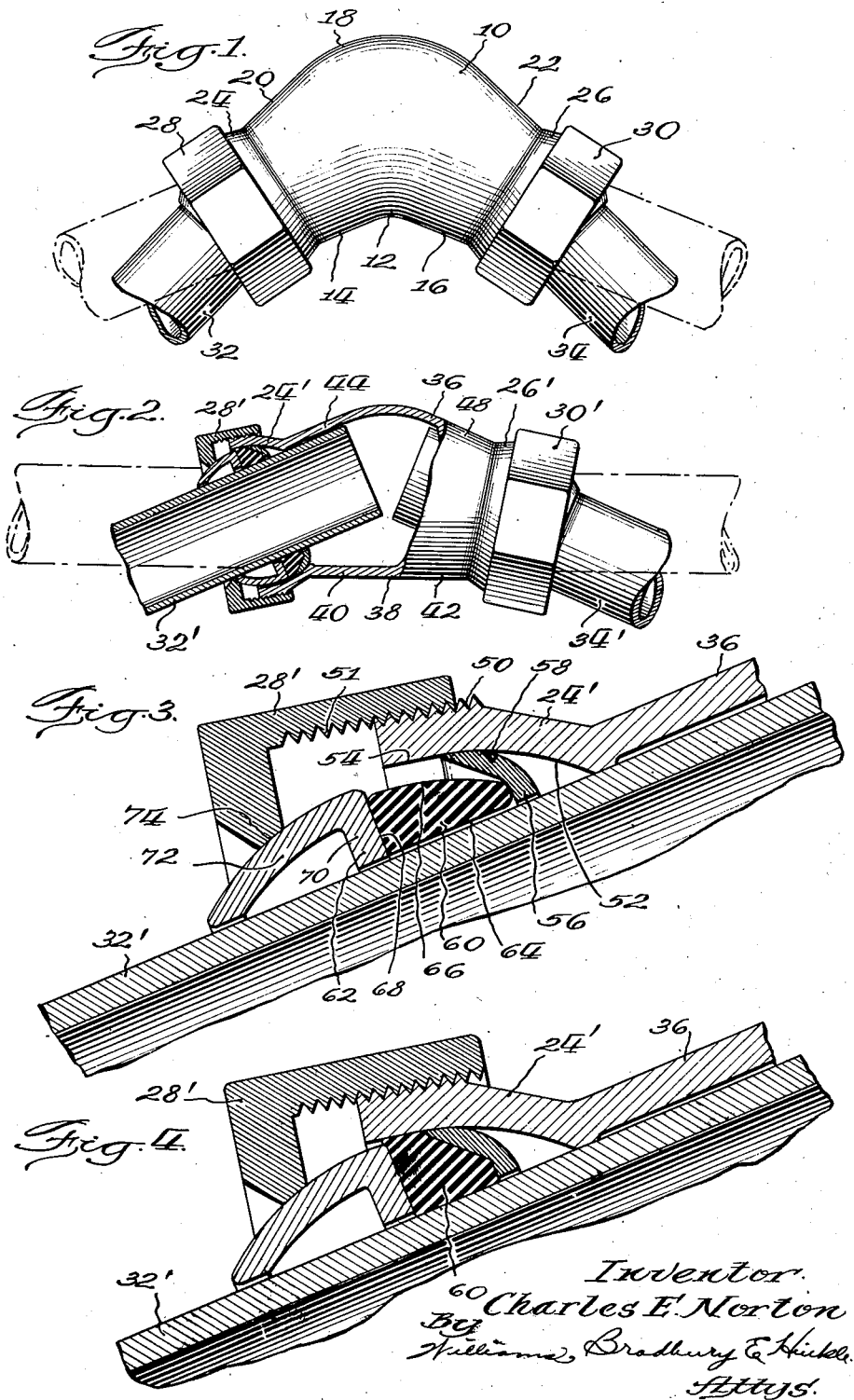
June 16, 1942.   C. E. NORTON   2,286,565
UNIVERSAL PIPE JOINT FITTING
Filed Nov. 9, 1940   2 Sheets-Sheet 1
Inventor
Charles E. Norton
By Williams, Bradbury & Hinkle
Attys.

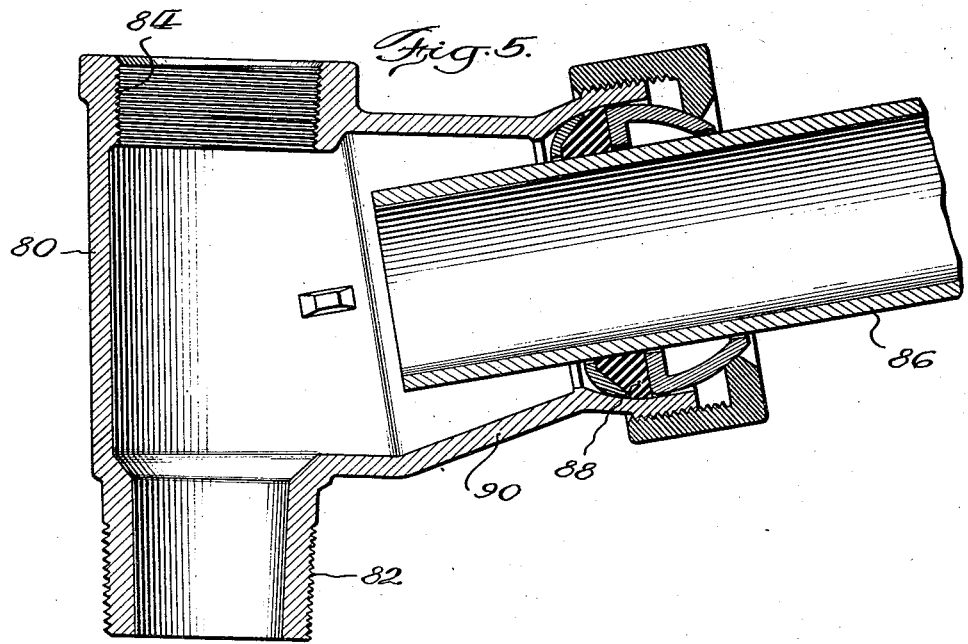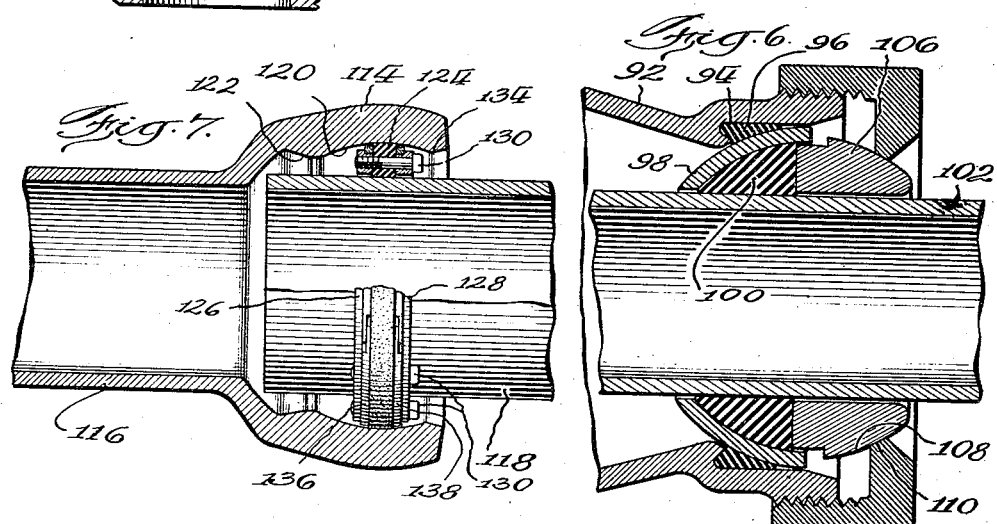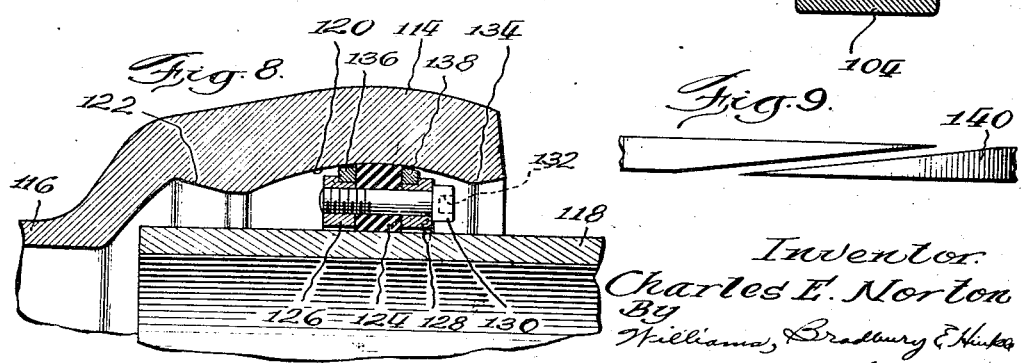

2,286,565

UNITED STATES PATENT OFFICE 2,286,565

UNIVERSAL PIPE JOINT FITTING

Charles E. Norton, Evanston, Ill., assignor to Norton-McMurray Manufacturing Company, Chicago, Ill., a corporation of Illinois Application November 9, 1940, Serial No. 364,987

13 Claims. (Cl. 285—95)

My invention relates to universal pipe joint fittings and is concerned with the fittings of this type used in all kinds of pipe installations.

An object of my invention is to provide a universal pipe joint fitting which will provide a greater range of universal movement than those heretofore used.

Another object of my invention is to provide an improved universal pipe joint fitting which will be simpler and less expensive than those heretofore in use.

Another object of my invention is to provide improved universal pipe joint fittings having wider ranges of utility than the fittings heretofore used whereby a lesser number of my new and improved fittings will replace a larger number of the old style fittings.

Another object of my invention is to provide an improved universal joint for pipe fittings and other pipe line connections.

Another object of my invention is to provide an improved method of making metal confining rings for the resilient gaskets.

Other objects will become apparent as the description proceeds.

Referring to the drawings, Fig. 1 is a side elevation of an improved L fitting embodying my invention;

Fig. 2 is a side elevation partially broken away to show the internal construction of another L fitting embodying my invention;

Fig. 3 is a partial sectional view on an enlarged scale of the L fittings of Figs. 1 and 2, showing the parts of my improved universal joint in partially assembled position;

Fig. 4 is a view similar to Fig. 3, but showing the parts in fully assembled position;

Fig. 5 is a sectional elevation of a T fitting embodying my invention and shows this fitting connected to a pipe section;

Fig. 6 is a sectional view of a pipe joint utilizing a modified form of universal joint;

Fig. 7 is a sectional view of a universal joint connection between two sections of pipe;

Fig. 8 is a partial view on an enlarged scale of the joint of Fig. 7; and

Fig. 9 shows a modified form of split ring which may be used in lieu of the split ring shown in Fig. 7.

Referring to Fig. 1, I have shown in this figure a pipe connection formed with my improved 45° to 90° L fitting. This fitting, designated generally by reference numeral 10, is of tubular construction and has an inner wall 12 formed of sections 14 and 16 located at an angle of 45° to each other. The outer wall 18 of this fitting is composed of sections 20 and 22, formed at an angle of 90° to each other.

Each end of the fitting 10 is provided with a flaring mouth 24 or 26, provided with external threads for receiving nuts 28 and 30 adapted to form parts of universal pipe joints with pipe sections 32 and 34. The structure of a preferred form of these universal joints is best illustrated in Figs. 3 and 4.

In Fig. 2 I have shown another L fitting known as a straight to 45° fitting. This fitting 36 has an inner wall 38 formed as a straight line or what may be referred to as portions 40 and 42 located at an angle of 180° to each other. The outer wall of the fitting 36 has portions 44 and 48 located at an angle of 45° with respect to each other.

Each end of the fitting 36 is provided with a flaring mouth 24' and 26', identical with the mouths 24 and 26 of the previous embodiment. Nuts 28' and 30' are secured to these flaring mouths by suitable threads and form part of the universal joints for connecting the fitting 36 with the pipe sections 32' and 34'.

Referring to Fig. 3 it will be noted that the mouth 24' of the fitting 36 is provided with external threads 50 adapted to be engaged by complementary internal threads 51 on the nut 28'. The mouth 24' is provided with an internal spherical surface 52 which, at its largest diameter, merges with a cylindrical surface 54. The cylindrical surface 54 is preferably located beyond the sealing portion of the joint and is provided in lieu of continuing the spherical surface 52 to the extreme end of the mouth 24', since the cylindrical surface is easier to machine than is a contracting spherical surface and the cylindrical surface also facilitates the insertion of the parts which I shall now describe.

A ring 56 of metal or other suitable material is provided for engagement with the spherical surface 52 and surrounds the pipe section 32. This ring 56 is preferably made of relatively thin metal which may be stamped into the shape illustrated in the drawings and whereby a spherical, or substantially spherical, surface 58 is provided for engagement with the spherical surface 52. Since it is not important that the ring 56 form a sealing engagement with the surface 52, the surface 58 need not be perfectly spherical or highly finished and I have found that an entirely satisfactory shape for the ring 56 may be provided by a simple stamping operation.

The ring 56 forms a limit stop to limit penetration of the gasket 60 into the mouth 24' under the thrust of the follower ring 62. The gasket 60 is preferably made of rubber or other suitable compressible and resilient material. This gasket may be provided with a slightly tapered inner surface 64 to facilitate relative movement between the gasket 60 and the pipe section 32' before the gasket 60 is compressed. The outer surface 66 of the gasket 60 is preferably rounded, as shown in Fig. 3 of the drawings and the gasket is provided with a square butt 68 engaging a perpendicular shoulder on the follower ring 62.

The follower ring 62 may assume any desired shape, but the particular shape and structure shown in Fig. 3 has certain definite advantages. I have found that this follower ring can be made by forming a cylindrical tube with an inwardly directed flange 70. The follower ring 62 is then placed in a die which deforms the cylindrical portion to form the curved part 72 having an external surface approximating that of a sphere. Since it is not necessary for the external surface of the portion 72 to seal with the co-acting surface 74 of the nut 28', no particular effort need be exerted to polish or otherwise accurately finish the external surface of the part 72. The surface 74 of the nut 28' may be conical instead of spherical, the conical form being preferable in that it is easier to produce.

The method of making the follower ring 72 which I have just described is superior to anything heretofore known and has the further advantage of producing a follower ring of minimum weight. In many installations the weight of this follower ring may be immaterial, but in certain installations the reduction in weight afforded by my improved follower ring is important.

Fig. 4 shows the position assumed by the parts when the nut 28' has been tightened to effect a fluid tight universal joint between the L 36 and the pipe section 32'. In this position of the parts the gasket 60 has been deformed and the inner surface of the gasket pressed firmly into engagement with the outer surface of the pipe section 32' and the outer surface of the gasket is pressed into firm and sealing engagement with the inner surface of the mouth 24'. The distortion of the material of the gasket causes the inherent resiliency of the gasket to press firmly against the outer surface of the pipe section 32' and the inner surface of the mouth 24' for all positions of the universal joint. It is to be understood, of course, that each end of each L is provided with a universal joint like that shown in Figs. 3 and 4.

In Fig. 2 the pipe sections 32' and 34' can be located anywhere between the 45° angle between these pipe sections in the full line position and the straight or 180° angle between these pipe sections in the positions indicated by the dot and dash lines in this figure. The L in Fig. 2 is thus known as 0° to 45° L.

The L of Fig. 1 is designed to supplement the L of Fig. 2 and to provide for angles of 45° to 90°, inclusive. In this figure the pipe sections are shown in full lines in the 90° position and in dotted lines in the 45° position, but it will be understood that these pipe sections may assume any angles between these two. With the two simple fittings of Figs. 1 and 2 it is, therefore, possible to provide for all angular relations of pipes from 0 to 90°. Furthermore, it is not necessary that the pipes lie in the same plane.

In Fig. 5 I have shown a T fitting provided with my new and improved universal joint. This T fitting is designed to be substituted for the T fittings now commonly used to connect gas mains with the service pipes leading to the individual houses and eliminates several swivel connections or other complicated pipe arrangements heretofore necessary where the angle between the service pipe and the gas main differed from the particular angle for which the T heretofore used was designed.

The T of Fig. 5 is represented generally by the reference numeral 80 and has a threaded lower end 82 adapted to be screwed into the gas main running in front of the houses supplied therefrom. The upper end of the T is provided with an internal thread 84 adapted to accommodate a plug which seals the upper end of the T after the installation has been completed. The T 80 has a lateral extension 90 connected to the service pipe 86 by a universal joint 88 of the kind which I have just described. With this particular arrangement of T it is possible to accommodate a wide range of vertical angles between the service pipe 86 and the vertical axis of the T as well as to accommodate various lateral angles between the service pipe 86 and the lateral extension of the T into which it is secured.

In Fig. 6 I have shown a modified form of universal joint which may be used in lieu of the form of universal joint I have heretofore described. In Fig. 6 the female member 92 has a recess 94 provided with a gasket 96 of rubber or other suitable material. The gasket 96 forms a seal between the member 92 and the outer surface of the spherically shaped annulus 98 whose interior engages a second gasket 100 likewise of rubber or other suitable material. The gasket 100 forms a seal between the annulus 98 and the outer surface of a pipe section 102. The annulus 98 may be originally formed as a cylinder and pressed into the shape illustrated in Fig. 6 by forcing it into a suitably shaped die. A nut 104 threadedly engages the member 92 and forces a follower ring 106 against a gasket 100. The force exerted on the gasket 100 by the follower ring 106 is transferred to the gasket 96 so that both gaskets 96 and 100 are distorted and form a fluid tight seal between the member 92 and the pipe section 102.

The follower ring 106 preferably has a spherical outer surface 108 which engages a surface 110 of the nut 104. The surface 110 may be either conical or spherical, as preferred. The universal joint of Fig. 6 may be used interchangeably with the universal joint of Figs. 1 to 4, inclusive, but requires an additional gasket and to a slight extent is, therefore, less desirable than the perfected embodiment of universal joint.

In Figs. 7 and 8 I have shown a further form of universal joint particularly adapted for connecting two sections of pipe. The joint has the advantage of simplicity and requiring only a very slight change in the conventional bell mouthed pipe now commonly in use. While this joint was particularly designed for connecting pipe sections, it, like the other universal joints illustrated herein, can be used in connection with all kinds of pipe fittings for all general purposes.

In Figs. 7 and 8 I have shown the bell mouth 114 of a pipe section 116 as receiving the end of a pipe section 118. The bell mouth 114 is preferably provided with a spherical surface 120 and a conical surface 122. The latter surface forms a flaring recess to receive the inner end of the pipe section 118 and thus provides for greater angular movement between the pipe sections.

The gasket 124 of rubber or other suitable material is located between compression rings 126 and 128, urged towards each other by a series of spaced bolts 130 threaded into the ring 128 and having heads provided with tool receiving recesses 132.

The gasket 124 and rings 126 and 128 must be made of such size that they can be inserted into the bell mouth 114 through the restricted opening 134. I have accordingly found it desirable to provide the compression rings 126 and 128 with auxiliary split rings 136 and 138, respectively, which in the assembled position are located as shown in Figs. 7 and 8 of the drawings and function as radially outward extensions of the compression rings 126 and 128.

When the bolts 132 are tightened the compression rings 126 and 128, with their auxiliary rings 136 and 138, are drawn together and the gasket 124 distorted into sealing engagement with the outer surface of the pipe section 118 and the spherical surface 120 of the bell mouth 114. Because the surface 120 is spherical, the pipe section 118 may assume any desired angular relation to the pipe section 116 within the range of movement of the universal joint. This range of movement is determined by the engagement of the inner end of the pipe section 118 with the flaring surface 122.

In Fig. 7 the split rings 136 and 138 are illustrated as being provided with stepped ends similar to the stepped ends ordinarily provided on the piston rings of internal combustion engines. In Fig. 9 I have illustrated an alternative form of split ring 140 which may be used in lieu of the stepped form of Fig. 7. The ring 140 has tapered overlapping ends in lieu of the stepped ends of the preferred form. It will be understood that is assembling the sealing means of Figs. 7 and 8 in the bell mouth 114 it is necessary in the form shown to remove the auxiliary rings 136 and 138 from the main compression rings 126 and 128 in order to permit the split rings to contract sufficiently to pass through the restricted opening 134. After the split rings have been passed through this opening they can readily be reassambled on their respective compression rings. As clearly shown in the drawings the gasket 124 and ring 128 have suitable openings for receiving the bolts 130 and, as previously stated, these bolts are preferably threaded into the ring 126 in lieu of using separate nuts.

It will be noted that in all forms of my invention the female part has a flaring surface inwardly of the universal joint and adapted to be engaged by the end of the inserted pipe to determine the limit to the range of angular movement afforded by the universal joint. In this construction the parts of the universal joint do not have to perform the additional function of limiting angular movement between the two sections of pipe or between a section of pipe and a fitting and the universal joint parts may, therefore, be designed solely from the standpoint of forming a universal joint and not a limit stop for angular movement.

Reference is made to my co-pending application Serial No. 376,777, filed January 31, 1941, wherein I have illustrated and claimed a T connection like that of Fig. 5 except that in my component application the lower end of the T is provided with a swivel connection instead of with an external thread.

While I have illustrated and described several forms of my invention, it is to be understood that my invention is not limited to the particular details shown but may assume numerous other forms within the scope of the appended claims.

I claim:

1. A pipe joint of the universal type comprising a first member having a spherical inner surface, a metal annulus engaging said surface, said metal annulus comprising a flat washer deformed to provide a generally spherical outer surface and a recessed inner surface, a second annulus comprising an inwardly directed flange and a cylindrical extension deformed to provide a substantially spherical outer surface and a recessed inner surface, a resilient gasket between said annuli and a nut threadedly engaging said member and adapted to press said gasket between said annuli and force said gasket into sealing engagement with the spherical surface of said member and the external surface of a complementary member telescoped into said first member.

2. A universal joint comprising a first member having a spherical inner surface, a metal ring having a spherical outer surface and a recessed inner surface, a rubber gasket engaging said ring, a second ring having a flat surface abutting said gasket, a spherical outer surface, and a recessed inner surface, said member, gasket and rings being adapted slidably to receive a second member, and threaded means for compressing said gasket between said rings and into sealing engagement with said members to form a universal joint therebetween.

3. A universal joint comprising a first member providing a restriction adapted to receive a second member therein, said first member having an enlargement beyond said restriction, a gasket located in said enlargement, said gasket being of resilient material, a pair of metal annuli located in said enlargement, means for urging said annuli towards each other to compress said gasket, and a second gasket between said annuli and compressed thereby.

4. A universal pipe joint of the class described comprising a pipe section having a bell mouth provided with an internal spherical surface, a second pipe section having an end adapted to be received within said bell mouth, a gasket confined between said bell mouth and the end of said second pipe section, a pair of split rings for confining said gasket, and threaded means for urging said split rings toward each other to compress said gasket and form a seal between said pipe sections.

5. That method of forming a universal joint which comprises the steps of, first, forming an annulus having a straight side, and second, forcing said annulus into a die to convert said straight side into a curved side, and third, assembling said annulus with a flexible gasket, pipe sections, and a nut threaded to one of said sections to form a universal joint.

6. A universal joint comprising a gasket of flexible material, a metal compression ring on each side of said gasket, an auxiliary split ring movably associated with each of said compression rings and forming a radial extension thereof, said split rings being compressible to permit insertion of said split rings through an opening of smaller diameter than the normal diameter of said rings, and means for compressing said gasket between said rings to form a fluid tight seal between surfaces on complementary members.

7. A light-weight annular metal washer having a spherical outer surface terminating in a radial shoulder, a recessed inner surface adapted to surround a tubular member, and spaced annular restrictions for engaging said member.

8. A pipe fitting having a female part for receiving one end of a connecting pipe, said part terminating in a mouth adapted to form part of a universal joint connecting said fitting with said pipe, said female part having wall portions terminating adjacent said mouth and diverging away from said mouth in straight lines to form a substantially cone-shaped recess whereby the range of angular relationships resulting from the universal movement between the fitting and said pipe is the same for all degrees of insertion of said pipe within said recess.

9. A pipe fitting having a female part for receiving one end of a connecting pipe, said part terminating in a mouth adapted to form part of a universal joint connecting said fitting with said pipe, said female part having wall portions terminating adjacent said mouth and diverging away from said mouth in straight lines located at different angles to the axis of said mouth to form a recess having the shape of an irregular cone whereby the range of angular relationships resulting from the universal movement between the fitting and said pipe is the same for all degrees of insertion of said pipe within said recess, but the maximum angular misalignment between said pipe and axis varies with different horizontal and vertical positions of said pipe.

10. A T-shaped pipe fitting having aligned openings and a female part for receiving one end of a connecting pipe, said part terminating in a mouth adapted to form part of a universal joint connecting said fitting with said pipe, said female part having wall portions terminating adjacent said mouth and diverging away from said mouth in straight lines to form a substantially cone-shaped recess whereby the range of angular relationships resulting from the universal movement between the fitting and said pipe is the same for all degrees of insertion of said pipe within said recess, said recess being in communication with said openings.

11. A pipe fitting having a plurality of female parts for receiving ends of connecting pipes, each said part terminating in a mouth adapted to form part of a universal joint connecting said fitting with one of said pipes, each said female part having wall portions terminating adjacent its mouth and diverging away from its mouth in straight lines to form a substantially cone-shaped recess whereby the range of angular relationships resulting from the universal movement between the fitting and each pipe is the same for all degrees of insertion of such pipe within the recess provided therefor.

12. A pipe fitting having a pair of female parts for receiving ends of connecting pipes, each of said parts terminating in a mouth adapted to form part of a universal joint connecting said fitting with one of said pipes, each said female part having wall portions terminating adjacent its mouth and diverging away from its mouth in straight lines to form a substantially cone-shaped recess whereby the range of angular relationships resulting from the universal movement between the fitting and each said pipe is the same for all degrees of insertion of such pipe within the recess provided therefor, there being a wall portion of one recess forming a straight line continuation of a wall portion of the other recess.

13. An angular pipe fitting for connecting pipes whose axes intersect at angles of 45° to 90° having an inner side and an outer side and female parts for receiving ends of connecting pipes, each of said parts terminating in a mouth adapted to form part of a universal joint connecting said fitting with one of said pipes, each said female part having wall portions terminating adjacent its mouth and diverging away from its mouth in straight lines to form a substantially cone-shaped recess whereby the range of angular relationships resulting from the universal movement between the fitting and each said pipe is the same for all degrees of insertion of such pipe within the recess provided therefor, inner wall portions of said recesses being located at an angle of approximately 45° and outer wall portions of said recesses being at an angle of 90°.

CHARLES E. NORTON.